(12) United States Patent
Bala et al.

(10) Patent No.: US 8,250,227 B2
(45) Date of Patent: Aug. 21, 2012

(54) PROVIDING DIFFERENT RATES TO DIFFERENT USERS OF A DOWNLOAD SERVICE

(75) Inventors: Vasanth Bala, Rye, NY (US); Michel Imhasly, Fiesch (CH); Giovanni Pacifici, New York, NY (US); Michael J. Spreitzer, Croton On Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 11/681,190

(22) Filed: Mar. 2, 2007

(65) Prior Publication Data
US 2008/0215749 A1 Sep. 4, 2008

(51) Int. Cl.
*G06F 15/16* (2006.01)
(52) U.S. Cl. ........ 709/229; 709/225; 709/232; 709/233; 370/229; 370/232; 370/233; 370/234; 370/235
(58) Field of Classification Search ................. 709/225, 709/229, 232, 233
See application file for complete search history.

(56) References Cited

U.S. PATENT DOCUMENTS

| | | | |
|---|---|---|---|
| 6,240,458 B1 * | 5/2001 | Gilbertson | 709/232 |
| 2004/0162901 A1 * | 8/2004 | Mangipudi et al. | 709/225 |
| 2005/0169172 A1 * | 8/2005 | Wang et al. | 370/229 |

* cited by examiner

*Primary Examiner* — Karen Tang
*Assistant Examiner* — Cheikh Ndiaye
(74) *Attorney, Agent, or Firm* — Ido Tuchman; Preston J. Young

(57) ABSTRACT

A system, computer program and method for transmitting requested data from a data source in response to data transmission requests from at least one electronic device according to differential rates of throughput. Data transmission requests are classified into one of a plurality of throughput classes, with each throughput class having an assigned rate of throughput. A proportion of data transmission requests to be processed from each throughput class is selected such that each data transmission request has a rate of throughput approximating the assigned rate of throughput of its class. The requested data is then sent from the data source to the electronic device.

15 Claims, 7 Drawing Sheets

PROVIDING DIFFERENT RATES TO DIFFERENT USERS OF A DOWNLOAD SERVICE

FIELD OF THE INVENTION

The present invention relates generally to computer network communication. More specifically, the invention relates to techniques for throughput differentiation for different clients communicating with a server.

BACKGROUND OF THE INVENTION

It is often beneficial to provide differing levels of service to different groups of customers. For example, service level differentiation allows key customers to be rewarded with a higher level of service. Service level differentiation also facilitates business models in which some customers pay higher fees in return for a higher level of service, while other customers pay lower fees but receive a lower level of service. Such business models may maximize revenue because customers placing a higher value on the service may pay more for a higher level of service than they would have under flat rate pricing. Conversely, if the price of a lower level of service is less than the flat rate price would have been, customers who would have been unwilling to pay the flat rate (and who would have thus provided zero revenue) may be willing to pay for the lower level of service.

Technology-based services may offer service level differentiation via differing service-level agreements. A service-level agreement is a contract or other promise that a customer will receive service according to certain minimum standards. Metrics subject to service-level agreements may include the rate of throughput at which data are transmitted, the maximum response time, the overall volume of data transmitted, the times of day at which data may be transmitted, the number of concurrent connections permitted and the probability that the service will be available at any given point in time (commonly known in the art as uptime.) A service-level agreement promising a higher level of service may have a higher price. For example, a service may charge US $5 per month for a service-level agreement guaranteeing a minimum download speed of 1 megabit per second but may charge US $10 per month for a service-level agreement guaranteeing a minimum download speed of 5 megabits per second.

Techniques are known in the art to impose upper or lower bounds on most of the metrics listed above. In some cases, imposing a limit is straightforward. To impose an upper bound on overall volume of data transmitted, for example, a system can simply refuse further data transfer once the limit has been reached. Ensuring a maximum response time, by contrast, is more challenging.

BRIEF SUMMARY OF THE INVENTION

The present invention addresses the above-mentioned limitations of the prior art by introducing a method, system and computer program product for imposing a minimum rate of throughput for data transfer. Moreover, the minimum rate of throughput may differ between data transfer requests.

Thus, one exemplary aspect of the present invention is a method for transmitting requested data from a data source in response to data transmission requests from at least one electronic device according to differential rates of throughput. The method includes a classifying operation for classifying the data transmission requests into one of a plurality of throughput classes. Each of the throughput classes has an assigned rate of throughput. A proportion of data transmission requests are selected for processing from each throughput class such that each data transmission request has a rate of throughput approximating the assigned rate of throughput of its throughput class. The requested data are then sent from the data source to the electronic device.

In a first approach, the method includes instantiating at least one requester for each of the selected data transmission requests. The requester is configured to retrieve a defined quantity of data from the data source. A fetching operation obtains the defined quantity of data by the requester from the data source. The requester is queued and then dequeued after a defined period of time calculated to cause the rate of throughput to approximate the assigned rate of throughput for the data transmission request. The fetching, queuing and dequeuing operations are iteratively repeated until the requested data is completely transmitted to the electronic device.

In a second approach, the method includes instantiating a requester for the data transmission request. The requester is added to one of a plurality of requester queues. Each of the requester queues contains requesters for data transmission requests belonging to the same throughput class. A dequeuing operation removes the requester from the queue according to a weighted round robin algorithm. The dequeued requester retrieves a defined quantity of data and transmits this data to the electronic device. The adding, dequeuing, retrieving and transmitting operations are iteratively repeated until the requested data is completely transmitted to the electronic device.

Another exemplary aspect of the present invention is a system for transmitting data at a defined rate of throughput in response to client data requests. The includes a client-side adapter configured to instantiate one or more requesters in response to a client data request. Each requester is configured to periodically request a defined quantity of data, store a received defined quantity of data and wait for a defined period of time. The defined period of time is calculated to cause the rate of throughput for the client data request to approximate a defined value. A middleware manager is configured to control a response time for the client data requests.

Yet a further exemplary aspect of the invention is a system for transmitting data in response to data requests from at least one client according to differential rates of throughput. The system includes at least one requester associated with a data request. The data request is assigned a rate of throughput, and the requester is configured to request a defined quantity of data from a server and transmit the defined quantity of data to the client. One or more requester queues are configured to contain requesters corresponding to data requests with a particular assigned rate of throughput. A queue manager is configured to instantiate the requester in response to the data request and to dequeue the requester from the requester queue according to a weighted round robin algorithm. The requester, upon being dequeued, is configured to requeue itself within the requester queue if data subject to the data request is not completely transmitted.

Another aspect of the invention is a computer program product embodied in a tangible media. The computer program product includes computer readable program codes configured to classify the data transmission requests into one of a plurality of throughput classes, select a proportion of data transmission requests to be processed from each throughput class such that each data transmission request has a rate of throughput approximating the assigned rate of throughput of its throughput class, and send the requested data from the data source to the electronic device.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
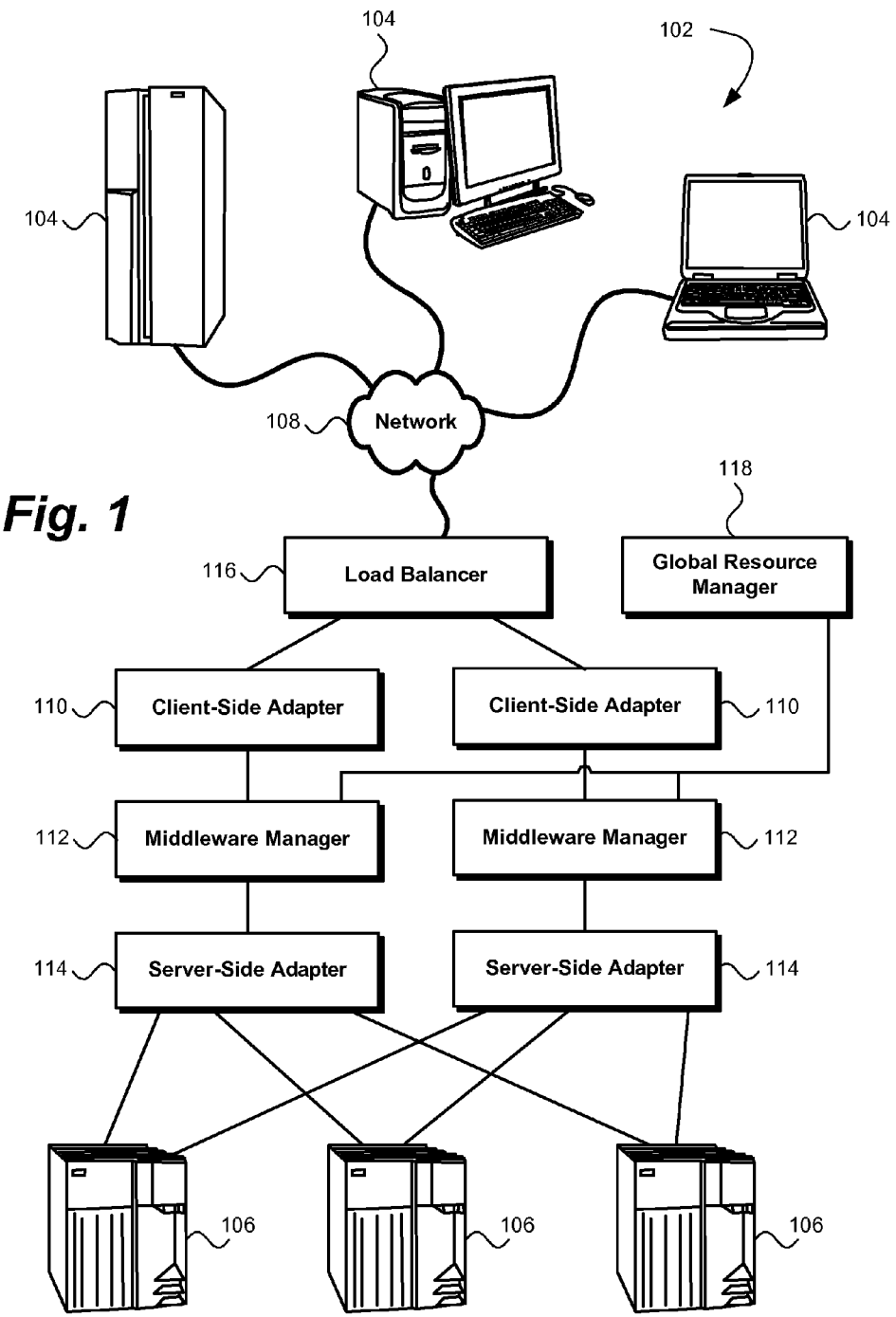
FIG. 1 shows an exemplary system for transmitting data at a defined rate of throughput using a tunneling strategy.

The present invention will be described with reference to embodiments of the invention. The embodiments below do not limit the present invention described in claims and all the combinations of components described in the embodiments are not necessary for means to solve the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 shows an exemplary system for transmitting data at a defined rate of throughput using a tunneling strategy. In this strategy, differential rates of throughput are enforced by tunneling a request through components that effect the desired rate of throughput.

The system 102 includes one or more clients 104. Clients may be any of a wide variety of systems known in the art. Clients may be computing systems, electronic systems, mechanical systems or systems of any other nature. Clients may incorporate any of a wide variety of architectures, operating systems and computer program products. A single system may include clients of diverse types.

Each client 104 may request the transmission of data from a server 106. A server, in the context of the present invention, may be any system incorporating functionality for transmitting one or more units of data. Servers may be any of a wide variety of systems known in the art. Servers may incorporate any of a wide variety of architectures, operating systems and computer program products. As shown in the figure, a system 102 may include multiple servers. Different servers may offer different data for transmission. Also, the same data may be redundantly offered on more than one server. In an embodiment of the present invention, this fact is used to allow redirection of a data transmission request from one server to another server which also contains the requested data. Data transmission from the server redirected to in this fashion may begin at the point where data transmission from the server redirected from ceased. Redirection of the data transmission may allow recovery from the failure of a server. Redirection may also be advantageous for balancing the load between servers, which may in turn help avoid overloading any one server while others have excess capacity.

A request from a client 104 may be assigned a minimum rate of throughput. Such a rate of throughput may be assigned due to business considerations. For example, a client may have been provided a service level agreement guaranteeing at least 5 megabits per second throughput. A rate of throughput may also be defined due to technical considerations. For example, a video stream may require a certain rate of throughput to be displayed at its intended speed.

Furthermore, different requests may be assigned different minimum rates of throughput. For example, one client 104 may have been provided a service level agreement guaranteeing a rate of throughput of 5 mbit/s, whereas another client may have a service level agreement guaranteeing only a rate of throughput of 1 mbit/s. To allow for this possibility, data transmission requests may be classified into one or more classes, with each class having an assigned rate of throughput. Extending the previous example, the requests with a rate of throughput of 5 mbit/s may be classified into one class, while the requests with a rate of throughput of 1 mbit/s may be classified into a second class. Requests are processed differentially according to their class so as to cause each data transmission request to have a rate of throughput approximating the assigned rate of throughput of its class.

The clients 104 are connected to a network 108. The network may be any of various types known in the art, including by example and without limitation TCP/IP, Wi-Fi®, Bluetooth® piconets, token ring and microwave. Wi-Fi is a registered trademark of the Wi-Fi Alliance, Austin, Tex., United States. Bluetooth is a registered trademark of Bluetooth SIG, Inc., Bellevue, Wash., United States. The network may allow a client to contact a server 106. However, for reasons that will become apparent from the discussion below, the connection is initially routed to an intermediary rather than directly to the server. It is noted that the network is not essential to the present invention. For example, a direct hardware connection may exist to allow the client to contact the server.

The request from the client 104 is received at a client-side adapter 110. The client-side adapter (or CSA for brevity) processes the client request by making a series of its own requests to a server-side adapter 114. Each such request from the CSA may be for a defined quantity of data. The CSA may be implemented in hardware, software or any combination thereof. It may incorporate any of a wide variety of architectures, operating systems and computer program products. It is noted that the CSA need not be a dedicated system. In particular, the CSA may be implemented as a subsystem within the system incorporating the middleware manager 112. In an embodiment of the present invention, the CSA is a Java servlet under Websphere® Application Server 5.0. Websphere is a registered trademark of International Business Machines Corporation, Armonk, N.Y., United States.

A middleware manager 112 may be interposed between the client-side adapter 110 and the server-side adapter 114. Thus, requests from the client-side adapter to the server-side adapter, and vice versa, may be routed through the middleware manager. The middleware manager is configured to control the response time of requests. Specifically, it may ensure that the response time for a given request does not exceed a defined limit. It may further ensure different maximum response times for different requests. The middleware manager may be implemented in hardware, software or any combination thereof. It may incorporate any of a wide variety of architectures, operating systems and computer program products. In an embodiment of the present invention, the middleware manager is implemented using Web Services Middleware Management (WSMM) from IBM. WSMM can execute under Websphere Application Server 5.0.

A server-side adapter 114 is configured to respond to requests from the client-side adapter 110 for a defined quantity of data. The server-side adapter (or SSA for brevity) responds to such requests by itself requesting the defined quantity of data from a server 106. The server-side adapter may be implemented in hardware, software or any combination thereof. It may incorporate any of a wide variety of architectures, operating systems and computer program products. In an embodiment of the present invention, the SSA is implemented as a web service under Websphere Application Server 5.0.

It is noted that the server-side adapter 114 need not be a dedicated system. In particular, the SSA may be implemented as a subsystem within the system including the middleware manager 112. Conversely, in an embodiment of the present invention, the functionality of the SSA is instead provided by the server 106 itself. In this embodiment, the client-side adapter 110 requests defined quantities of data directly from the server.

The server-side adapter 114 retransmits the defined quantity of data received from the server 106 back to the middleware manager 112. The middleware manager 112 again retransmits the data back to the client-side adapter 110 while ensuring a maximum response time. The CSA 110 utilizes the ensured maximum response time to enforce a minimum rate of throughput. The client-side adapter 110 also stores the received defined quantities of data transmitted by the server-side adapter 114. Finally, the CSA 110 transmits the data thus stored to the client 104 which originally made the request.

The client-side adapter 110 and server-side adapter 114 may also translate between the protocols used by the clients 104, server 106 and middleware manager 112. In an embodiment of the present invention, the middleware manager communicates via the Simple Object Access Protocol (SOAP.) SOAP is a protocol designed to interface with web services, allowing not just sending and receiving data but also invoking remote functionality generally. Using SOAP for this purpose is thus beneficial for facilitating the complex download functionality of the present invention. By contrast, in this embodiment, the client and server communicate via the Hypertext Transfer Protocol (HTTP). HTTP is a ubiquitous protocol used in the art for requesting and sending data via Internet-based networks. Thus, permitting the use of HTTP is beneficial because many clients and servers known in the art are capable of receiving and transmitting data via HTTP. The client-side adapter 110 thus receives HTTP requests from the client, transmits SOAP requests to the middleware manager, receives SOAP responses from the middleware manager and transmits HTTP responses back to the client. Similarly, the server-side adapter 114 receives SOAP requests from the middleware manager, transmits HTTP requests to the server, receives HTTP responses from the server and transmits SOAP requests back to the middleware manager.

A system 102 may include more than one middleware manager 112. Multiple middleware managers 112 may beneficially allow a larger number of clients 104 to simultaneously request data than would be possible with a single middleware manager. Multiple middleware managers may also advantageously provide redundancy so data are available even in the event that a middleware manager fails. A load balancer 116 may receive incoming client requests and may assign requests to middleware managers 112 using an algorithm designed to assign an approximately equal amount of processing to each middleware manager. A request may be forwarded to the client-side adapter 110 associated with its assigned middleware manager. In an embodiment of the present invention, the load balancer is an L4 (Layer 4) load balancer.

In an embodiment of the present invention, the middleware managers 112 are implemented using Web Services Middleware Management. Each middleware manager 112 may implement a gateway configured to receive incoming requests. Each middleware manager 112 may further implement a separate queue for each rate of throughput to which client requests may be assigned. For example, if a client request may be assigned a rate of throughput of either 1 megabit per second or 5 megabits per second, one queue may be implemented for requests to be transmitted at 1 mbit/s and another queue may be implemented for requested to be transmitted at 5 mbit/s. A load balancer 116 may forward incoming requests to the gateway of the assigned middleware manager. The user who generated the incoming request may also be authenticated. Upon successful authentication, the request is placed into a queue based upon its assigned rate of throughput. The requests are dequeued using a weighted round-robin algorithm. A global resource manager 118 periodically queries each gateway for the arrival rates and observed response times for each rate of throughput. The global resource manager 118 may use this information to compute new weights for the weighted round-robin algorithm for each gateway. The weights are selected to cause each client request to have a rate of throughput as close as possible to its assigned rate of throughput.

It is noted that where a system includes more than one middleware manager, there need not be a one-to-one correspondence between middleware managers and CSA's. Likewise, there needs not be a one-to-one correspondence between middleware managers and SSA's.

To summarize, a client 104 may request data from a server 106. The request is assigned a minimum rate of throughput. Furthermore, different requests may have different rates of throughput. A client-side adapter 110, a middleware manager 112 and a server-side adapter 114 interpolate themselves within the message flow of the download process to enforce the assigned rate of throughput for each request. The middleware manager 112 enforces a maximum response time on a request. The client-side adapter 110 may adapt the upper bound on response time enforced by the middleware manager 112 into the desired lower bound on the rate of throughput. The client-side adapter 110 and server-side adapter 114 may also convert the protocols used by the client 104 and server 106 to the protocol used by the middleware manager, and vice-versa.

Figure 2:
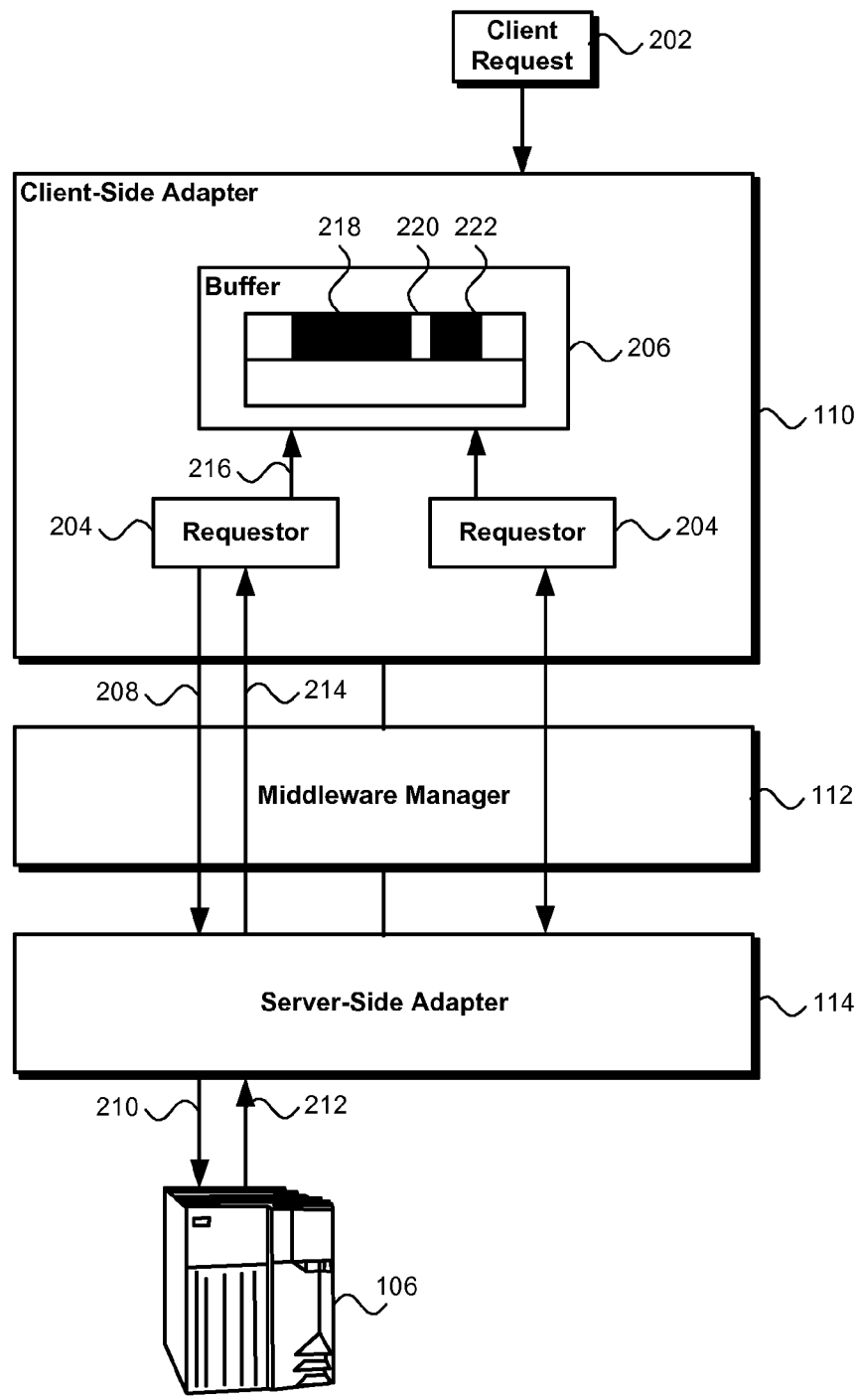
FIG. 2 provides additional detail about an exemplary configuration of a client-side adapter in a system for transmitting data at a defined rate of throughput using a tunneling strategy.

Turning now to FIG. 2, additional detail is provided about an exemplary configuration of a client-side adapter 110 in a system for transmitting data at a defined rate of throughput using a tunneling strategy. The exemplary CSA 110 is used to demonstrate mathematical calculations performed by an embodiment of the present invention.

A client-side adapter 110 may receive a request 202 from a client asking for specific data to be transmitted. In response to the client request 202, the CSA 110 may instantiate one or more requesters 204. A requester 204 may be any unit of executable program logic, including without limitation threads, processes, subroutines, and any other proper or improper subset of a computer program product. A requester 202 may be interpreted and may be compiled. In an embodiment of the present invention, each requester 202 is implemented as a thread. Each requester 202 may be configured to periodically request a defined quantity of data. Such requests may be placed to a server-side adapter 114.

The client-side adapter 110 further instantiates a buffer 206 to contain received data related to the client request 202. The buffer 206 may be implemented using any of various storage media known in the art, including without limitation random access memory, magnetic memory and optical memory. Furthermore, the buffer 206 may be implemented using a wide variety of data structures known in the art. In one embodiment, the buffer 206 is an array. The buffer 206 may contain a defined number of positions in which defined data may be stored. In an embodiment of the present invention, the number of positions is 256.

A client-side request object is instantiated in response to a client request 202 in order to encapsulate all logic and data related to that request. In particular, the requesters 204 and buffer 206 may be encapsulated within the client-side request object. A client-side request object may be implemented using any of a variety of programming constructs known in the art which group related logic and data. Such programming constructs may include without limitation objects in object-oriented programming languages and processes in a multitasking operating system.

The middleware manager 112 is configured to control the response times of requests 208 made by the requesters 204. Specifically, the middleware manager 112 may attempt to ensure that the round-trip response time for such a request does not exceed a defined limit. The maximum response time may vary depending on the assigned rate of throughput of the client request 202 to which the requester requests are related. The maximum response time may be configured to effect the rate of throughput on a mathematical basis discussed in further detail below.

A server-side adapter 114 receives requests 208 from a requester 204 for a defined quantity of data. The SSA 114 responds to such a request by itself requesting 210 the defined quantity of data from a server 106. The SSA 114 may receive 212 the defined quantity of data from the server. It may assign a sequence number to the received defined quantity of data. Assigning a sequence number allows data to be reconstructed in the correct order even if it is not received at the CSA 110 in the order in which it is transmitted. The SSA 114 may retransmit 214 the defined quantity of data to the requester 204.

Generally, multiple requester requests 208 are made in order to fulfill a single client request 202. Therefore, to maintain state, the server-side adapter 114 instantiates a server-side request object in response to a client request in order to encapsulate all logic and data related to that request. A server-side request object may be implemented using any of a variety of programming constructs known in the art which group related logic and data. Such programming constructs may include without limitation objects in object-oriented programming languages and processes in a multi-tasking operating system. The SSA 114 may also maintain a hash table to associate client requests with their corresponding server-side request objects. The hash table may be keyed on a unique ID of the client request.

A requester 204 may receive 214 a defined quantity of data in response to one of its own requests 208. When this occurs, the requester 204 may store 216 the data in the buffer 206. To determine the position within the buffer in which to store the data, the requester 204 may take the sequence number of the defined quantity of data modulo the number of positions in the buffer. It is contemplated that the positions in the buffer are numbered sequentially from zero to (n−1), where n is the number of positions in the buffer. This algorithm ensures data are stored in the correct order even if network issues or other considerations cause the data to be received out of order at the client-side adapter 110. It also may beneficially reduce storage space requirements by allowing the buffer to be smaller than the quantities of data transmitted.

The client-side adapter 110 transmits data stored in the buffer 206 to the client 104. However, the CSA 110 may elect to do so only if the buffer positions in which the defined quantities of data stored are continuous. In an exemplary download scenario displayed here, buffer positions 22 through 71 218 contain data, buffer position 72 220 is empty and buffer positions 73 through 85 222 also contain data (note that the buffer is not drawn to scale). The CSA 110 may begin to transmit data beginning from buffer position 22 and may transmit data sequentially until buffer position 71 is reached. However, transmission of buffer positions 73 through 85 may be suspended until the defined quantity of data which would be stored in buffer position 72 is received at the CSA 110.

Despite the presence of rate control, it is possible for data to be transmitted from the server 106 to the client-side adapter 110 at a faster rate than it is transmitted from the CSA 110 to the client 104. This may occur if, for example, the internal network between the server 106 and the CSA 110 is faster than the external network between the CSA 110 and the client 104. It would also be possible for a lag or other delay in the external network to interfere with transmission of the data to the client 104. When data is received at the CSA 110 faster than it can be transmitted to the client 104, there is a risk that a defined quantity of data will be overwritten before it is transmitted. Because data may be stored in the buffer by the sequence number modulo the size of the buffer, the risk exists if, for a given packet received at the CSA 110 but not transmitted to the client, an amount of data equal to or exceeding the size of the buffer has been transmitted after that packet has been received. Therefore, to prevent data from being overwritten, the client-side adapter 110 may suspend the requesting of defined quantities if an entire half of the buffer is filled.

As described in more detail below, the requester 104 waits for a defined period of time before making another request 208 to the server-side adapter 114 for more data. This period of time is calculated to cause the rate of throughput to approximate a defined value.

The rate of throughput is defined as the quantity of data per unit of time. This definition can be expressed using the following formula:

$$r = \frac{s}{t} \quad (1)$$

where:
s is the size of the defined quantity of data in bits,
t is the time between requests in seconds, and
r is the rate of throughput in bits per second.

In the context of the present invention, the size of the defined quantity of data s is typically known. It is contemplated that the requesters 204 request data of a specific size and/or the server-side adapter 114 accepts requests for data of a specific size. Under this assumption, to effect a desired rate of throughput r, it suffices to effect a time between requests of t.

It is a mathematical truism that if a quantity has an upper bound of x and a lower bound of x, that quantity in fact equals x. Thus, by effecting both an upper bound and lower bound of t, we effect a specific time t between requests. The purpose of the middleware manager 112 is to effect an upper bound for the time between requests. If the middleware manager is configured to enforce a maximum response time of $t_{mm}$ seconds, the upper bound for t is $t_{mm}$. (This may not be precisely true due to considerations discussed and addressed below. However, disregarding such considerations for the moment facilitates an understanding of the basic mathematical concepts underlying the present invention.)

Suppose the requester 104 waits for $t_{mm}$ seconds between requests. In this case, the lower bound for t is also $t_{mm}$. This is the case because even if the response time for a request is less than the maximum response time enforced by the middleware manager 112, the requester will still have waited between requests for the amount of time specified by the standard.

Because the upper bound and lower bound of t are both $t_{mm}$, t equals $t_{mm}$. Thus, we can rewrite equation 1 as follows:

$$r = \frac{s}{t_{mm}} \quad (2)$$

To effect a desired rate of throughput r at the middleware manager 112, an implementer of the present invention may specify r and s in equation 2 and apply algebra to solve for $t_{mm}$. The implementer may then configure the middleware manager to effect a maximum response time of $t_{mm}$ seconds and may further configure the requesters 204 to wait $t_{mm}$ seconds between requests.

However, it is contemplated that systems embodying the present invention will generally effect a desired rate of throughput not at the middleware manager 112, but instead at the client-side adapter 110. This is because the delay between the CSA and the middleware manager may be substantial. This is particularly true if the CSA and middleware manager are located within separate computing systems. However, the delay may not be negligible even in the case where the CSA and middleware manager are software systems existing within the same computing system.

In this case, the relevant response time is the round-trip response time between the CSA and the server. This time is simply the round-trip response time between the middleware manager and the server, plus the round-trip delay between the CSA and the middleware manager. Thus, the response time can be mathematically expressed as:

$$t_{csa} = t_{mm} + D \quad (3)$$

where:

$t_{csa}$ is the round-trip response time between the CSA and the server in seconds, $t_{mm}$ is the round-trip response time between the middleware manager and the server in seconds, and D is the round-trip delay between the CSA and the middleware manager in seconds.

The delay D may vary substantially between requester requests. This is the case because while the middleware manager 112 may control response times between itself and the server 106, the response time between the CSA and the middleware manager may not be regulated. To calculate D for a given requester request 208, one may rearrange equation 3:

$$D = t_{csa} - t_{mm} \quad (4)$$

Fortunately, both values on the right-hand side of equation 4 can be obtained. $t_{csa}$ can be measured at the client-side adapter 110. $t_{mm}$ is under the control of the system implementer. Furthermore, in an embodiment of the present invention, the actual round-trip response time from the middleware manager 112 is attached to the defined quantity of data transmitted to the CSA. The actual value thus returned may be used in the calculation.

To determine typical values of D, it may be necessary to repeat the calculation of equation 4 over multiple requests. This calculation may be repeated a predefined number of times. It may also be repeated until a desired degree of statistical confidence as to the nature of D is attained.

A constant T may then be selected in order to equal or exceed the actual delay D between the client-side adapter and a middleware manager with a desired degree of confidence. In an embodiment of the present invention, T is selected to exceed D for a predefined proportion of the requester requests. In a particular embodiment of the present invention, this proportion is 0.95. In another embodiment of the present invention, statistical analysis is applied to the distribution of D to determine a value of T which may exceed D with a desired degree of confidence.

The round-trip response time at the client-side adapter 110 thus is less than or equal to $T + t_{mm}$ within a desired degree of confidence. Thus, equation 1 can be rewritten using this information to determine the rate of throughput of a single requester 204:

$$r_r = \frac{s}{T + t_{mm}} \quad (5)$$

where:

$r_r$ is the rate of throughput at a single requester 204, s is the size of the defined quantity of data in bits, T is the constant determined above so as to exceed D with a desired degree of confidence, and $t_{mm}$ is the round-trip response time between the middleware manager and the server in seconds.

However, a single client request 202 may be processed by more than one requester 204. Thus, to determine total throughput at the CSA, we need only multiply equation 5 by the number of requesters:

$$r_{csa} = \frac{ms}{T + t_{mm}} \quad (6)$$

where:

$r_{csa}$ is the rate of throughput at the client-side adapter 110, and m is the number of requesters instantiated in response to a client request.

The parameters required to effect a desired rate of throughput at the CSA $r_{csa}$ can thus be determined by algebraically solving equation 6. To determine the maximum response time to be enforced by the middleware manager 112, one may solve the equation above for $t_{mm}$:

$$t_{mm} = \frac{ms}{r_{csa}} - T \quad (7)$$

To determine the amount of time a requester 204 shall wait for a given request, one may simply add T to the above value.

For example, assume that a rate throughput of $10 * 2^{20}$ bits (e.g., 10 megabits) at the client-side adapter 110 is desired. The packet size is $0.5 * 2^{20}$ bits (e.g., 0.5 megabits.) Two requesters 204 are instantiated for each client request 202. The delay between the CSA and middleware manager 112 is less than 0.5 seconds with a desired degree of confidence. We can substitute these values into equation 6:

$$t_{mm} = \frac{2(0.5 * 2^{20})}{10 * 2^{20}} - 0.5 = 0.78$$

The middleware manager of the exemplary system would be configured to apply a maximum response time of 0.78 seconds to requests having this assigned rate of throughput.

To determine the amount of time for which the requesters 204 should wait between requests, we would add T to this result:

$$t_{mm} + T = 0.78 + 0.5 = 1.28$$

Thus, the requesters 204 in the exemplary system would be configured to wait 1.28 seconds between requests having this assigned rate of throughput.

It is contemplated that calculation of the waiting period will start not from the time at which a requester receives data 214, but instead from the time at which the requester originally requested data 208. This algorithm may keep the time between requests made by the requester approximately constant.

Figure 3:
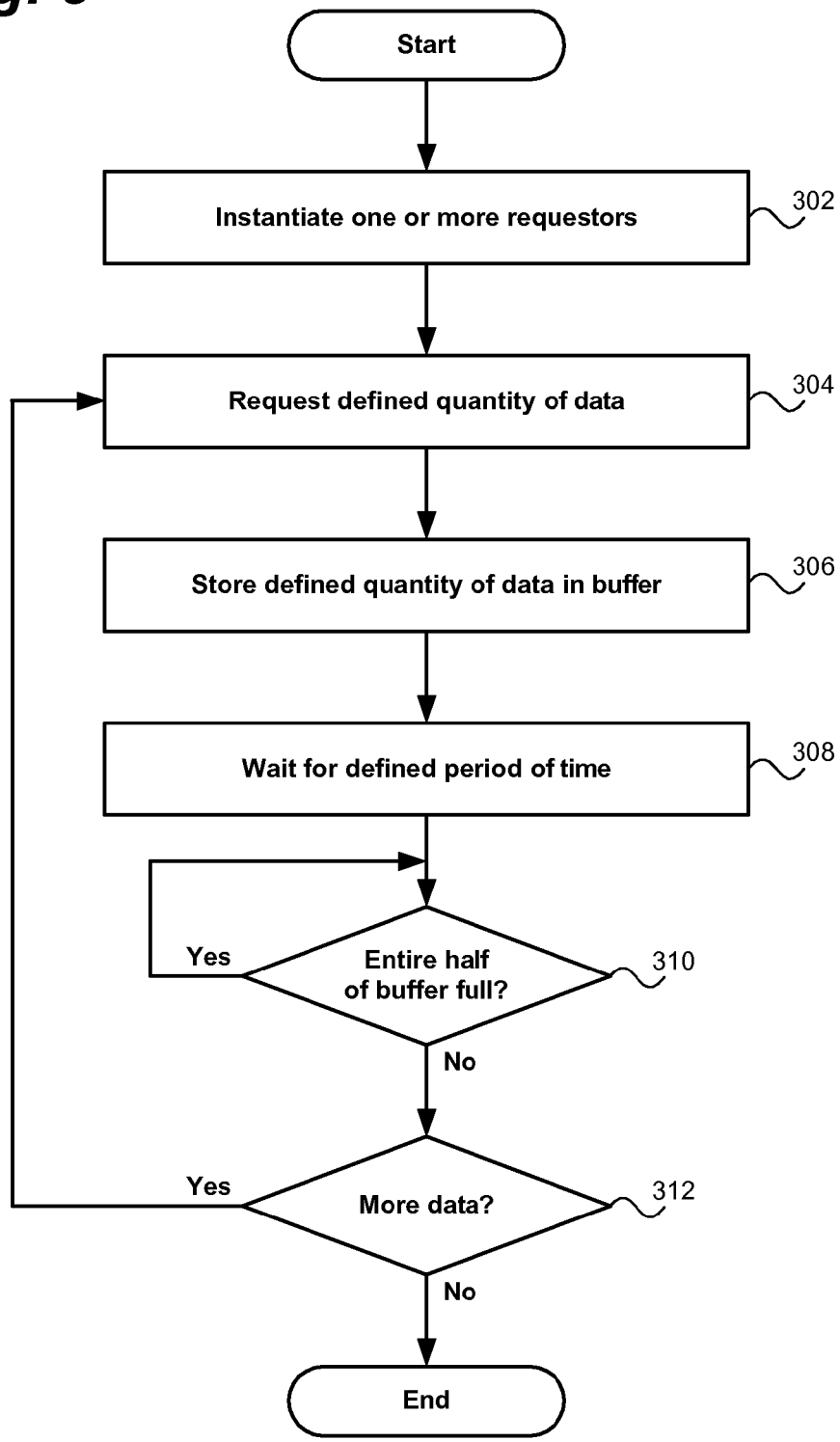
FIG. 3 demonstrates an exemplary flowchart of operations performed to transmit data at a defined rate of throughput using a tunneling strategy.

FIG. 3 illustrates an exemplary flowchart of operations performed to transmit data at a defined rate of throughput using a tunneling strategy.

At instantiating operation 302, a request for the transmission of data may be received at a client-side adaptor. The CSA may respond to the client request by instantiating one or more requesters. In the exemplary flowchart, only one requester is instantiated. If multiple requesters are instantiated, each requester would perform the following operations beginning from step 304, with the operations performed by each requester occurring in parallel.

In an embodiment of the present invention, instantiating operation 302 includes the client-side adapter invoking an instantiation method at the server-side adapter. The HTTP parameters and the credentials of the client and/or a unique request ID may be passed as arguments to this method. The instantiation method may be named "init". The SSA may thus create a server-side request object containing all information related to this request. The server-side request object may regenerate the original HTTP request and send it to the server to obtain a download stream. The SSA may then create an entry in a hash table containing the request ID and the server-side request object. If the preceding steps were successful, the CSA may create a client-side request object for the request. If the preceding steps failed, however, the CSA may finish processing without creating the requesters or the client-side request object. In this case, processing may stop at this point rather than continuing to step 304 and beyond.

At requesting operation 304, the requester may request a defined quantity of data. The request may be transmitted to a server-side adapter. In an embodiment of the present invention, the requests are transmitted by invoking a method of the SSA. This method may be named "getData". Upon invocation of this method, the SSA may query the hash table for the server-side request object related to this request. The SSA may then read a defined quantity of data from the download stream in the server-side request object. The number of bits requested may be constant. The SSA may transmit the defined quantity of data thus received back to the requester. After requesting operation 304 is completed, control passes to storing operation 306.

At storing operation 306, the requester receives and stores the requested defined quantity of data. Specifically, the received defined quantities of data may be stored in a buffer. The received defined quantity of data may include an assigned sequence number. The position within the buffer in which the storage occurs may be the sequence number modulo the number of positions in the buffer.

Data stored in the buffer may be transmitted to the client only in the event that the buffer positions in which the defined quantities of data are stored are continuous. The client-side adapter may transmit the data to the client, or the client may actively request the data from the CSA. It is noted that transmission of the buffer contents back to the client may occur in parallel to the operations performed by the requester. In an embodiment of the present invention, a thread within the CSA distinct from the requesters reads the buffer and transmits the data to the client. After storing operation 306 is completed, control passes to waiting operation 308.

At waiting operation 308, the requester waits for a defined period of time calculated to cause the rate of throughput to approximate a defined value. The defined period of time to wait may include a factor which, within a desired degree of confidence, equals or exceeds the actual delay between the client-side adapter and the middleware manager. The amount of time to wait may be calculated according to the mathematical equations described above. Specifically, the waiting period may begin from the time at which requesting operation 304 occurred rather than from the time at which data are received. Once waiting operation 308 is completed, process flow continues to determining operation 310.

Determining operation 310 checks whether an entire half of the buffer 206 has been filled. If so, determining operation 310 repeats until this condition is no longer present. Iterating in this manner effectively suspends the requesting of defined quantities of data by the requesters in order to prevent data from being overwritten.

At determining operation 312, it is determined whether more data remains to be transmitted. If data remains, control returns to requesting operation 304. If no data remains, the client request has been completely processed.

A requester may be able to determine the end of data based on its knowledge of the size of the data and the quantity of data already received. The end of data may also be communicated by the transmission of a special value indicating that no data remains. In an embodiment of the present invention, this value is null. Null is a special value in many programming languages known in the art signifying the absence of data. When the end of data is communicated by a special value, storage of the special value itself may be omitted, as it is not itself part of the requested data. Waiting operation 308 and determining operation 310 may also be omitted in this case, as they are superfluous given that the requester will not need to make another request.

Figure 4:
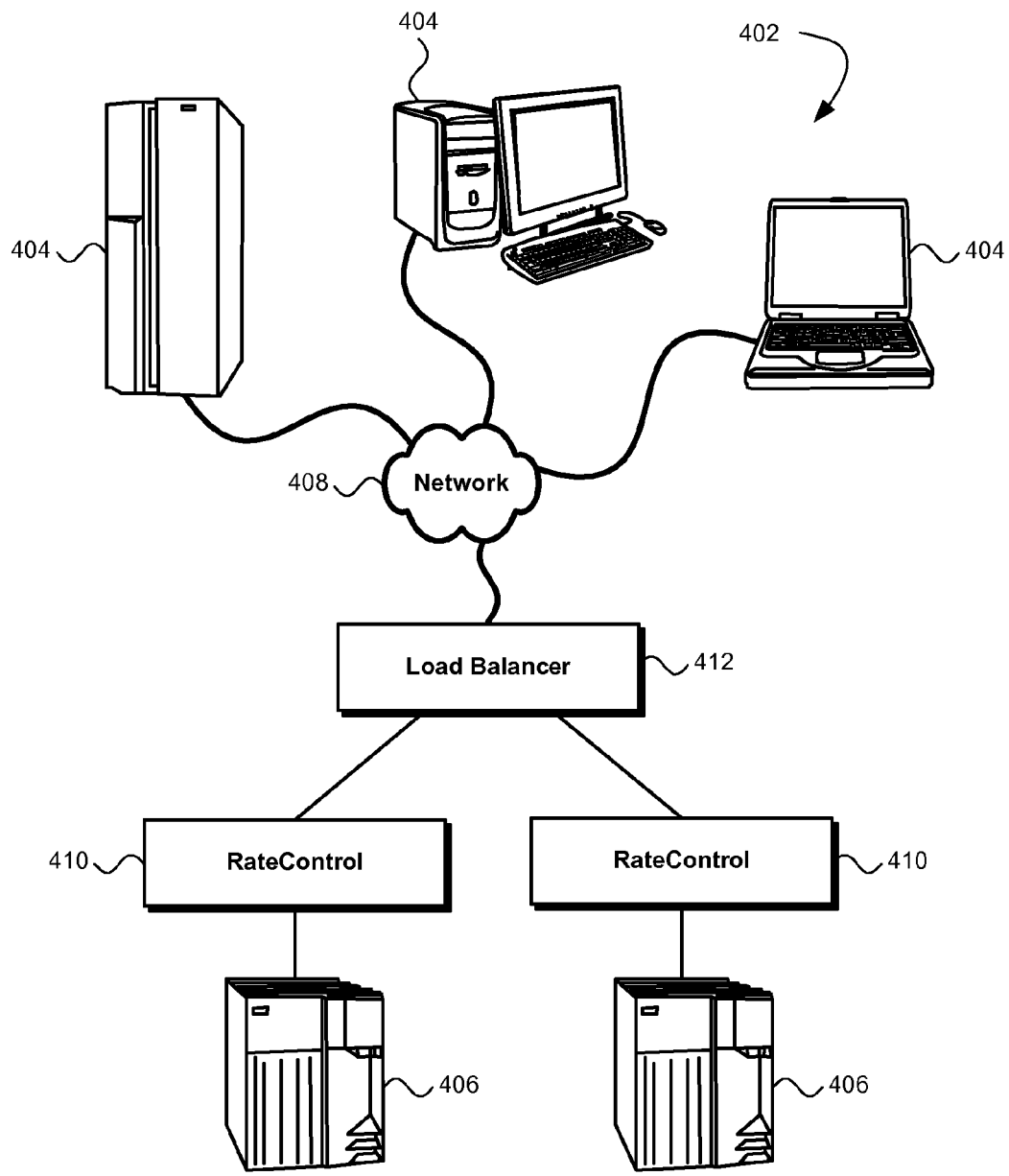
FIG. 4 shows an exemplary system for transmitting data at a defined rate of throughput using a rate control strategy.

Turning now to FIG. 4, an exemplary system 402 for transmitting data at a defined rate of throughput using a rate control strategy is shown. In this strategy, differential rates of throughput are enforced by a RateControl component that effects the desired rate of throughput.

The system 402 includes one or more clients 404. Clients within a system implementing a rate control strategy may be of similar types, natures and roles as clients 104 within a system 102 implementing a tunneling strategy. In particular, clients may be any of a wide variety of systems known in the art. Clients may be computing systems, electronic systems, mechanical systems or systems of any other nature. Clients may incorporate any of a wide variety of architectures, operating systems and computer program products. A single system may include clients of diverse types.

Each client 404 may request the transmission of data from a server 406. Servers within a system implementing a rate control strategy may be of similar types, natures and roles as servers 106 within a system 102 implementing a tunneling strategy. Specifically, a server may be any system incorporating functionality for transmitting one or more units of data. Servers may be any of a wide variety of systems known in the art. Servers 406 may incorporate any of a wide variety of architectures, operating systems and computer program products. As shown in the figure, a system 402 may include multiple servers 406. Different servers 406 may offer different data for transmission. Also, the same data may be redundantly offered on more than one server. In an embodiment of the present invention, this fact is used to allow redirection of a data transmission request from one server to another server which also contains the requested data. Data transmission from the server redirected to in this fashion may begin at the point where data transmission from the server redirected from ceased. Redirection of the data transmission may allow recovery from the failure of a server 406. Redirection may also be advantageous for balancing the load between servers, which may in turn help avoid overloading any one server while others have excess capacity.

As with the tunneling strategy, a request from a client 404 may be assigned a minimum rate of throughput. Such a rate of throughput may be assigned due to business considerations. For example, a client may have been provided a service level agreement guaranteeing at least 5 megabits per second throughput. A rate of throughput may also be defined due to technical considerations. For example, a video stream may require a certain rate of throughput to be displayed at its intended speed.

Furthermore, different requests may be assigned different minimum rates of throughput. For example, one client may have been provided a service level agreement guaranteeing a rate of throughput of 5 mbit/s, whereas another client may have a service level agreement guaranteeing only a rate of throughput of 1 mbit/s. To allow for this possibility, data transmission requests may be classified into one or more classes, with each class having an assigned rate of throughput. Extending the previous example, the requests with a rate of throughput of 5 mbit/s may be classified into one class, while the requests with a rate of throughput of 1 mbit/s may be classified into a second class. Requests are processed differentially according to their class so as to cause each data transmission request to have a rate of throughput approximating the assigned rate of throughput of its class.

The clients 404 are shown connected to a network. The network may be any of various types known in the art, including by example and without limitation TCP/IP, Wi-Fi®, Bluetooth® piconets, token ring and microwave. Wi-Fi is a registered trademark of the Wireless Ethernet Compatibility Alliance, Inc., Austin, Tex., United States. Bluetooth is a registered trademark of Bluetooth SIG, Inc., Bellevue, Wash., United States. The network 408 may allow a client 404 to contact a server 406. However, for reasons that will become apparent from the discussion below, the connection may initially route to an intermediary rather than routing directly to the server 406. It is noted, however, that the network 408 is not essential to the present invention. For example, a direct hardware connection may exist to allow the client 404 to contact the server 406.

A RateControl component 410 is interposed between the client 404 and server 406. Thus, requests from the client 404 for data on the server 406, and transmission of data from the server 406 to the client 404, may be routed through RateControl 410. RateControl 410 is configured to control the rate of throughput of each request so as to approximate its assigned rate of throughput. It may further ensure different rates of throughput for different requests. RateControl 410 may additionally impose a limit on the number of requests being processed at any given time and may queue incoming requests received once this limit has been reached. RateControl 410 may be implemented in hardware, software or any combination thereof. It may incorporate any of a wide variety of architectures, operating systems and computer program products. It is noted that RateControl 410 need not be a dedicated system. In particular, RateControl 410 may be implemented as a subsystem within the server 406. Finally, there need not be a one-to-one correspondence between servers 406 and RateControl components.

It is noted that RateControl 410 selectively divides resources among requests rather than affirmatively restricting the rate of throughput of a request. In particular, if sufficient resources exist to process all requests at the maximum speed, RateControl may simply allow this result instead of imposing artificial limits on the rate of throughput. In some embodiments of the present invention, this behavior may be desirable. In other embodiments of the present invention, it may be desirable to cause requests in classes with a higher rate of throughput to be transmitted faster than classes with a lower rate of throughput in all cases. This may be accomplished by reducing the maximum number of requests which may be simultaneously processed.

Each RateControl 410 can effect differential rates of throughput for different requests via a queuing mechanism. As previously mentioned, incoming data transmission requests may be classified into one or more classes based on their assigned rate of throughput. Each RateControl 410 may maintain a separate queue for each such class. RateControl 410 may select the proportion of data transmission requests to be processed from each class in order to cause each data transmission request to have a rate of throughput approximating the assigned rate of throughput of its class. When a class is selected, a request may be dequeued from its corresponding queue. A defined quantity of data related to the dequeued request may be read from the server 406. The request may then be replaced in the queue for its class.

Each RateControl 410 may also limit the number of requests which may be simultaneously processed on its corresponding server 406 using a scanning mechanism. To accomplish this goal, RateControl 410 may include one or more scanners to scan for incoming data transmission requests. If an incoming request is received, and the limit on requests has not been reached, the scanner may simply begin processing the request. If the maximum number of requests has been reached, the scanner may instead queue the incoming request. The scanner may use a single queue for this purpose. In this case, the scanner may dequeue requests without regard to their assigned rate of throughput. Alternatively, the scanner may maintain a separate queue for each rate of throughput class and may selectively dequeue requests for processing according to their class. To continue a previous example, requests having a 5 mbit/s rate of throughput may be dequeued for processing with a higher priority than requests having a 1 mbit/s rate of throughput.

In an embodiment of the present invention, incoming requests are transmitted to RateControl 410 using the Transmission Control Protocol (TCP.) A different port may be provided for each rate of throughput class. The scanner may maintain a separate queue for each class and may place requests received at a port for a given class in the queue corresponding to that class. It may dequeue requests selectively based on their assigned rate of throughput.

In another embodiment of the present invention, incoming requests are transmitted to RateControl 410 using the Hypertext Transfer Protocol (HTTP). A different Uniform Resource Locator (URL) may be provided for each rate of throughput class. The scanner may maintain a single queue for all rates of throughput. It may dequeue requests without regard to their assigned rate of throughput.

As previously noted, a system 402 may include more than one server 406. Multiple servers may beneficially allow a larger number of clients 404 to simultaneously request data than would be possible with a single server. Multiple servers may also advantageously provide redundancy so data are available even in the event that a server and/or RateControl 410 fails. A load balancer 412 may receive incoming client requests and may assign requests to servers using an algorithm designed to assign an approximately equal amount of processing to each server and RateControl 410. A request may be forwarded to the RateControl 410 associated with its assigned server. In an embodiment of the present invention, the load balancer 412 is an L4 (Layer 4) load balancer.

To summarize, a client 104 may request data from a server 106. The request is assigned a minimum rate of throughput, which may be different than the assigned rate of throughput for other requests. Hence, the request is classified into one of several classes, with each class having an assigned rate of throughput. A RateControl component 410 interpolates itself within the message flow of the transmission process to ensure the minimum rate of throughput for the request. RateControl 410 further determines the order in which incoming requests are processed. The order may or may not depend on the rate of throughput of the requests.

Figure 5:
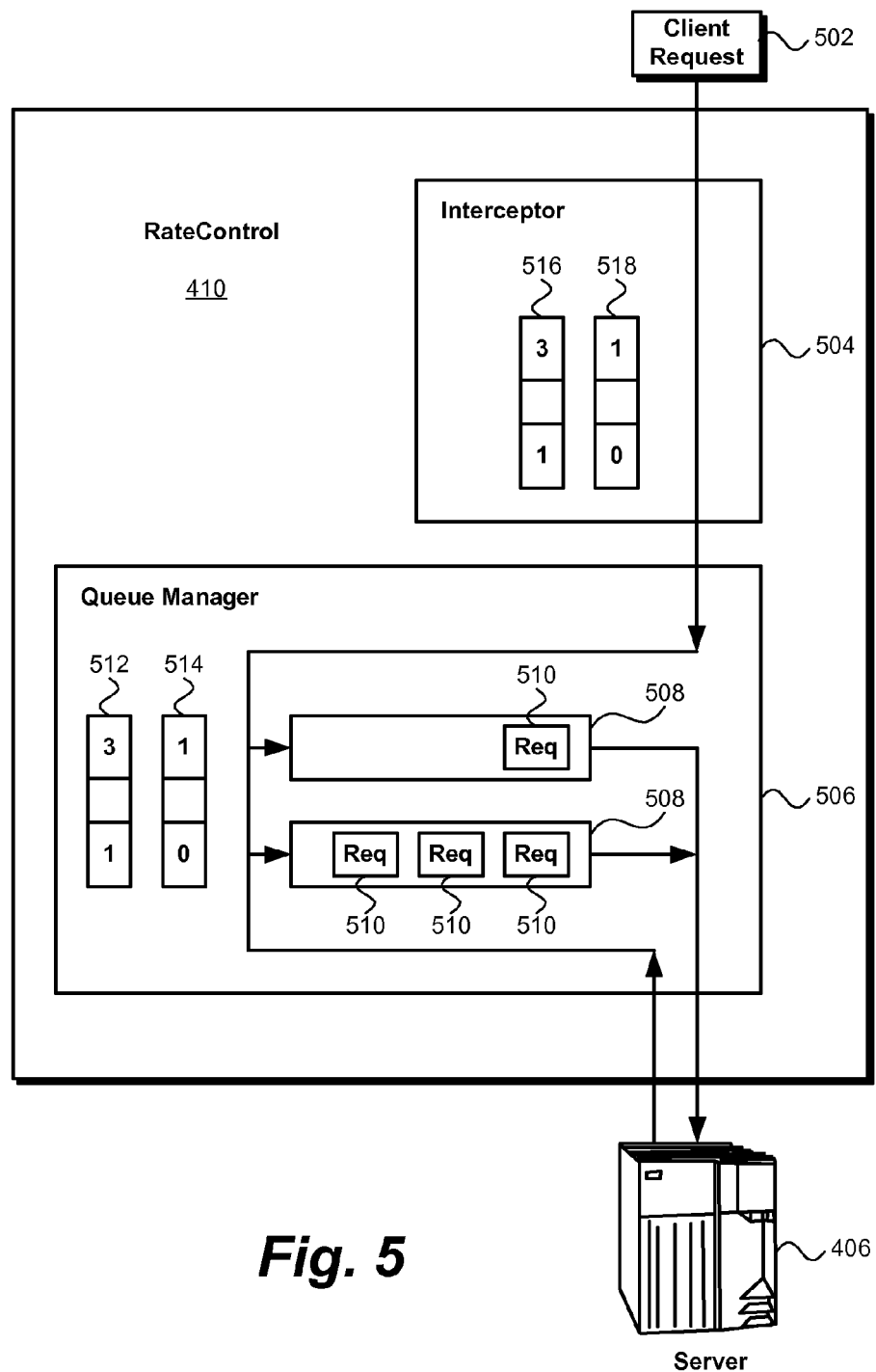
FIG. 5 provides additional detail about an exemplary configuration of a RateControl component in a system for transmitting data at an assigned rate of throughput using a rate control strategy.

Turning now to FIG. 5, additional detail is provided about an exemplary configuration of a RateControl component in a system for transmitting data at an assigned rate of throughput using a rate control strategy.

An incoming request 502 may be received from a client. The request 502 is received at the RateControl unit 410 by an interceptor 504. The interceptor 504 may receive requests transmitted in various known protocols and expressed in various known formats. The interceptor may also enforce a limit on the maximum number of requests which may be concurrently processed by the RateControl unit 410. If this limit is reached, the request 502 may be queued instead of being received immediately. Queuing requests for later processing is discussed after first discussing the case where the request is accepted for immediate processing.

When a client request 502 is accepted for processing, it is received at a queue manager 506. The primary function of the queue manager 506 is to manage data transmission requests in process via a queueing mechanism. The queue manager 506 may be implemented in hardware, software or any combination thereof. It may incorporate any of a wide variety of architectures, operating systems and computer program products. In an embodiment of the present invention, the queue manager is a thread. The queue manager 506 may further include one or more queues 508. Each queue 508 may correspond to requests having a certain assigned rate of throughput. The queues 508 may be implemented using a wide variety of data structures known in the art.

The queue manager 506 may instantiate a requester 510 in response to the incoming client request 502. It is noted that while some similarities exist between this requester 510 and the requester 204 of the tunneling strategy (see FIG. 2), substantial differences can exist in functionality and structure. A requester 510 may be any unit of executable program logic, including without limitation threads, processes, subroutines, and any other proper or improper subset of a computer program product. A requester 510 may be interpreted or be compiled. In an embodiment of the present invention, each requester 510 is implemented as a thread.

Upon being instantiated, the requester 510 may be added to the queue 508 related to requests to be transmitted at the same rate of throughput as the request it was instantiated to process. Queueing the requester 510 may be achieved by the queue manager 506 or by the requester itself. In a particular embodiment, a counter variable tracking the number of requests being concurrently processed is be incremented once the requester 510 is added to the queue 508.

The queue manager 506 may dequeue requesters 510 according to a weighted round robin algorithm. The weights used in the algorithm may be selected in order to cause each requester 510 to have a rate of throughput approximating the assigned rate of throughput of its corresponding client request 502. It is noted that while a requester 510 is queued, time elapses but no data is transmitted. Therefore, longer amounts of time spent in a queued state directly result in a lower average rate of throughput.

A limit on the maximum number of requesters which may concurrently receive data may be imposed. It is noted that this limit is distinct from the limit on the overall number of active requests. Thus, the queue manager 506 may continue to dequeue requesters 510 until either this limit is reached or until no more requesters remain in any queue.

Once dequeued, a requester 510 may request a defined quantity of data from a server 406. The data received in response may be transmitted to the client that made the request 502 which the requester 510 is fulfilling. The data may also be stored or cached locally for later transmission. It is noted that the selection of the quantity of data to be transmitted upon each dequeueing of the requester 510 may depend on the requirements of the application. In particular, a smaller quantity of data per dequeueing may result in a data transmission which is more continuous. This factor may be important for some data types, such as streaming audio and video. A smaller quantity of data causes more overhead in requeueing and dequeueing, because the time required to do so does not depend on the data quantity transmitted. Conversely, a large data quantity may cause a significant delay between one defined quantity of data and the next.

If data subject to the request 502 being fulfilled by the requester 510 are not completely transmitted, the requester 510 may then be replaced within the queue 508 from which it was dequeued. Replacing the requester 510 may be achieved by the queue manager 506 and may be achieved by the requester itself. In an embodiment of the present invention, the requester may be placed at the tail of the queue. In another embodiment of the present invention, the request 510 may instead be placed within the queue in order according to the timestamp applied to it when it was dequeued. Specifically, the timestamp of the requester being replaced may be compared to the timestamps applied to requesters already in the queue at the time each was most recently dequeued. The requester may be placed within the queue so that the requester in front of it (e.g., to be processed before it) has an earlier timestamp of last dequeueing and so that the requester behind it (e.g., to be processed after it) has a later timestamp of last dequeueing. If no requests within the queue have an earlier timestamp of last dequeueing, the requester is placed at the head of the queue. If no requests have a later timestamp, the requester is placed at the tail of the queue.

It is noted that utilizing the timestamp in this fashion beneficially reduces the effect of the actual delay in transmitting the defined quantity of data on the overall rate of throughput. If the transmission is delayed due to network lag or other technical factors, requeueing the requester 510 based on its timestamp may approximate the position it would have had in the queue if such delay had not occurred. It is further noted that queueing in general advantageously prevents a single problematic connection from preventing other requests 502 from being fulfilled. In this case, the requester hampered by the problematic connection will not be in the queue 508. Thus, other requesters 510 may continue to be selected from the queue and thus may continue to transmit data.

If the data subject to the request being fulfilled by the requester are completely transmitted, the requester 510 is not replaced within the queue 508. The requester 510 may instead finalize its operation. Specifically, the requester 510 decrements the counter variable that tracks the number of requests being concurrently processed. The requester 510 may then be terminated, which may include "garbage collection", such as freeing any resources which had been used by it.

The weights in the round robin algorithm according to which requesters 510 are dequeued are specified by a weight vector 512. The weight vector 512 may be implemented using a wide variety of data structures known in the art. A weight vector 512 may have one scalar value for each queue 508. The proportion of a scalar value for a given queue to the sum of all scalar values in the vector may approximate the proportion of the total bandwidth to be made available to requesters 510 in that queue 508.

The weight vector 512 may be used to define the rate of throughput of each of several classes of requests relatively to each other. For example, a weight vector having a value of 3 for a first class of requests and a value of 1 for a second class of requests may cause requests in the first class to have three times the rate of throughput of requests of the second class.

The weight vector 512 may also be used to approximate a specific rate of throughput for each of several classes of requests. Consider an exemplary system having a total bandwidth of 12 mbit/s. If two requests being processed are to have a rate of throughput of 5 mbit/s and two other requests are to have a rate of throughput of 1 mbit/s, the weight vector 512 should have a value of 5 for the former class and a value of 1 for the second class.

It is contemplated that the weight vector 512 may frequently be recalibrated to account for a changing composition of incoming requests. If at another moment in time, there is one request having a rate of throughput of 5 mbit/s and there are seven requests having a rate of throughput of 1 mbit/s, the weight vector 512 should have a value of 5 for the former class and 7 for the latter class. This way, the only request in the former class receives approximately 5/12 of the total bandwidth, or approximately 5 mbit/s, which is its assigned rate of throughput. The second class receives approximately 7/12 of the total bandwidth, or approximately 7 mbit/s. Split among the seven requests, each receives approximately 1 mbit/s, which is the assigned rate of throughput of each request.

A state vector 514 may correspond to the weight vector 512. The state vector 514 may have one scalar value for each queue, with each scalar value corresponding to the scalar value for the same queue within the weight vector. The state vector 514 may be implemented using a wide variety of data structures known in the art. The state vector 514 may be initialized to contain values identical to those in the weight vector 512.

If a limit on the maximum number of requesters 510 which may concurrently receive data has not been reached, the queue manager 506 may dequeue a requester 510 from a queue 508 whose corresponding scalar value in the state vector 514 is positive. The queue manager may then decrement the scalar value corresponding to the queue accessed by the preceding operation. The preceding two operations may be repeated until all scalar values in the state vector 514 are non-positive or until all queues for which the scalar value is positive are empty. In either case, the state vector 514 is reinitialized to the values contained within the weight vector 512.

It is emphasized that requesters 510 may only be dequeued while a limit on the maximum number of requesters which may concurrently receive data has not been reached. Suspending the dequeueing of requesters 510 due to such a limit may have no effect on the state vector 514. Broadly speaking, the dequeueing of requesters may be driven by whether the number of requesters currently receiving data is less than the limit. The state vector 514, by contrast, may determine the order in which requesters are dequeued at the time of the next dequeueing.

As mentioned previously, the interceptor 504 may enforce a limit on the maximum number of requests 502 that may be concurrently processed. If this limit is reached, an incoming request 502 may be queued instead of being received immediately. In an embodiment of the present invention, when this limit is reached, requests 502 are received at the interceptor but are placed in a queue within the interceptor 504 instead of being immediately forwarded to the queue manager 506. In another embodiment of the present invention, when this limit is reached, requests are not even received from the network. It is noted that many network protocols known in the art allow a request to wait within the network until the recipient is ready to receive the request.

If the limit has not been reached, the interceptor 504 may repeatedly accept requests 502 and forward them to the queue manager 506 until the limit is reached or until no more requests remain. As previously noted, a counter variable may track the number of requests currently being processed. The interceptor may simply compare this counter to the limit. If the limit has been reached, the interceptor 504 may wait for a specified period of time before comparing the counter to the limit again. This process may be repeated until the counter is less than the limit, in which case the interceptor 504 may again attempt to accept more requests. In an embodiment of the present invention, the specified period of time to wait is one second. In any case, it is contemplated that the specified period of time is small compared to the expected overall length of time of data transmission.

The interceptor 504 may accept requests 502 according to their assigned rate of throughput using a weighted round robin algorithm. The algorithm may utilize a weight vector 516 and state vector 518 similar to those used by the queue manager 506. However, the weights of the weight vector need not be the same as those used in the weight vector 512 of the queue manager 506. It is contemplated that the weights used in the interceptor's weight vector may be more divergent from each other than the weights used in the queue manager's weight vector.

An interceptor 504 may receive requests 502 transmitted via the Transmission Control Protocol (TCP). A TCP request may be transmitted to a specific port on a destination machine so as to influence the manner in which the request is processed. A port is designated by a number between 0 and 65,535. Thus, each possible rate of throughput at which requests may be transmitted may be received at a different port. For example, port 6010 may receive requests to be transmitted with a rate of throughput of 5 mbit/s, while port 6020 may receive requests to be transmitted with a rate of throughput of 1 mbit/s. The interceptor may use a weighted round robin algorithm as previously discussed to determine the next port to be scanned. The interceptor may then scan the selected port, may receive the first incoming request (if any) at that port and may begin processing that request.

In an embodiment of the present invention, a TCP-based interceptor 504 may be a stand-alone Java program executing on IBM Java 1.3.1. It is noted that port scanning inherently requires non-blocking input-output application programmer interfaces (API's). Unfortunately, IBM Java 1.3.1 does not offer the requisite functionality. Thus, a workaround may be used in which a non-blocking "accept" command is simulated by activating the socket timeout. This may be achieved by setting the socket property "soTimeout=1 ms".

The interceptor 504 may also accept requests 502 without regard to their assigned rate of throughput. In this case, the weight vector 516 and state vector 518 may not be required. Rather, the interceptor may simply accept requests only when the number of requests being concurrently processed is less than the limit.

An interceptor 504 may receive requests 502 transmitted via the Hypertext Transfer Protocol (HTTP). The interceptor may scan for incoming HTTP requests, receive the first incoming request (if any) at that port, and begin processing that request. A different Uniform Resource Locator (URL) may be specified for each rate of throughput class. For example, incoming requests to be transmitted with a rate of throughput of 5 mbit/s may include the URL "http://server:8080/RC/Premium", while requests to be transmitted with a rate of throughput of 1 mbit/s may include the URL "http://server:8080/RC/Basic". It is noted that while an HTTP request generally includes a requested URL, the URL is generally not available until the request has been accepted for processing. In an embodiment of the present invention, a HTTP-based interceptor 504 may be a Java servlet executing on Apache Tomcat.

Figure 6:
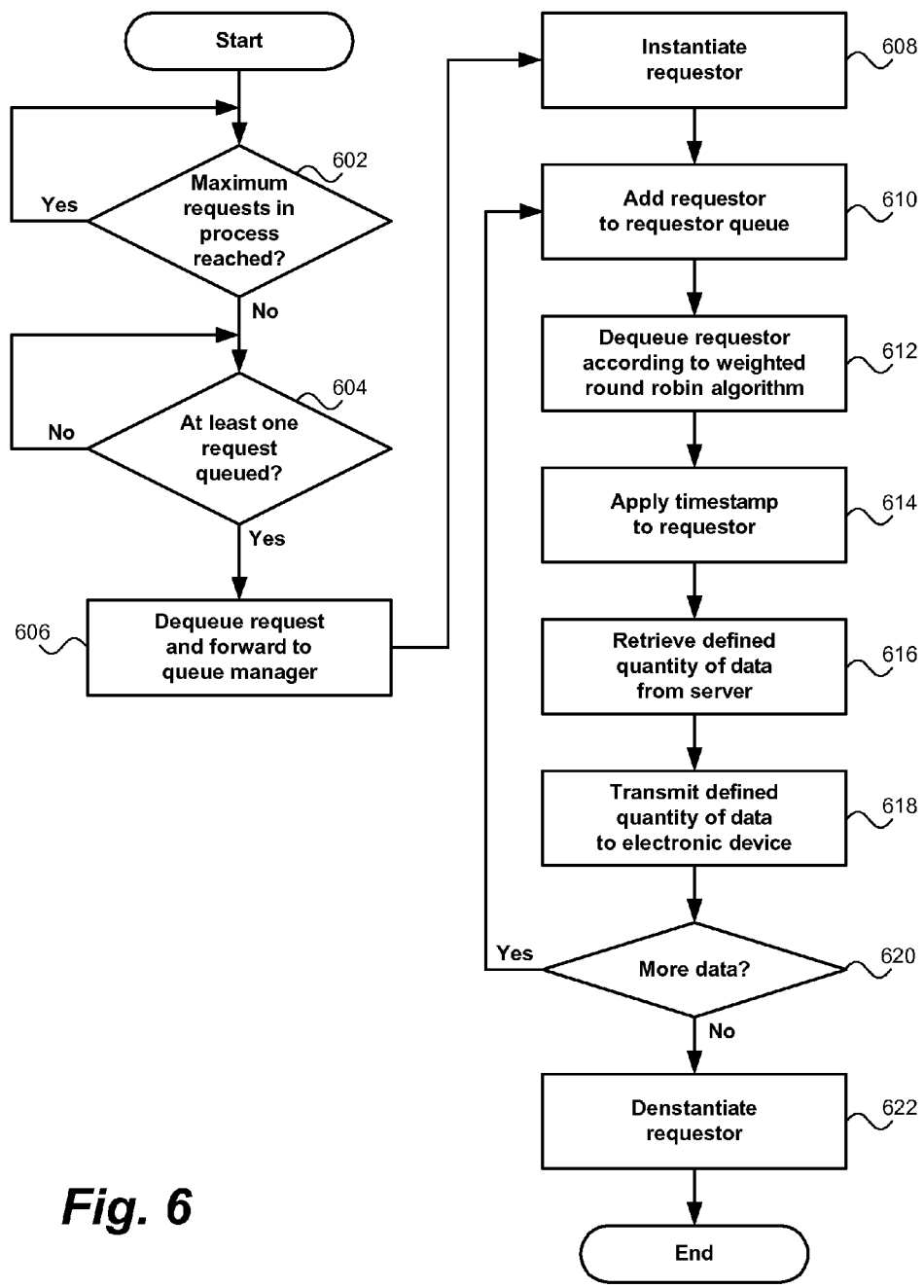
FIG. 6 illustrates an exemplary flowchart of operations performed to transmit data at a defined rate of throughput using a rate control strategy.

FIG. 6 illustrates an exemplary flowchart of operations performed to transmit data at a defined rate of throughput using a rate control strategy. The flowchart demonstrates operations performed from the perspective of an individual data transmission request, beginning from the receiving of the request and ending with the finalization of the request. It is contemplated that other data transmission requests are processed in parallel with the present request. The methods by which multiple requests are processed in parallel are discussed above.

At determining operation 602, the interceptor determines whether a maximum number of data transmission requests are being processed. This determination may comprise comparing a count of requests being processed to the specified maximum number of data transmission requests. If the number of requests being processed equals or exceeds the maximum number of data transmission requests, determining operation 602 is repeated, possibly after waiting for a specified period of time. If the number of requests being processed is less than the specified maximum number of data transmission requests, processing continues with determining operation 604. It is noted that this algorithm will cause control to remain at determining operation 602 until the number of requests being processed is less than the maximum.

At determining operation 604, the interceptor determines whether any data transmission requests are queued. If not, the interceptor waits for a defined period of time. In an embodiment of the present invention, the defined period of time to wait is one second. In any case, it is contemplated that the specified period of time is short compared to the expected overall length of time of data transmission. After waiting, determining operation 604 is repeated. If the number of requests being processed is less than the maximum number of data transmission requests, processing continues with dequeueing operation 606. It is noted that this algorithm will cause control to remain at determining operation 604 until at least one request is waiting to be processed.

At dequeueing operation 606, the interceptor dequeues one of the queued data transmission requests. The dequeued request is forwarded to the queue manager.

In an embodiment of the present invention, requests are dequeued according to their assigned rate of throughput using a weighted round robin algorithm. This goal may be achieved by using the weight vector and a state vector as previously defined. It is contemplated that the weight vector is selected in order to prioritize requests with higher assigned rates of throughput. The interceptor may dequeue a queued data transmission request having an assigned rate of throughput whose corresponding scalar value in the state vector is positive. The queue manager may then decrement the scalar value corresponding to the assigned rate of throughput of the request. If all scalar values in the state vector are non-positive or no more data transmission requests are queued, the interceptor may reinitialize the state vector to the values contained within the weight vector. This embodiment may be facilitated by assigning each assigned rate of throughput to a separate Transmission Control Protocol (TCP) port. Because a port can be scanned independently of all other ports, using TCP beneficially allows dequeueing a data transmission request of the selected throughput class.

In another embodiment of the present invention, requests may be dequeued without regard to their assigned rate of throughput. This embodiment beneficially facilitates the use of the Hypertext Transfer Protocol (HTTP), because HTTP connections to a given server are customarily routed to a single port on that server.

It is noted that the queuing action described above occurs within the network infrastructure. Specifically, data transmission requests are queued by allowing them to wait within the network pending acceptance. Features of the network, such as different TCP ports, may be configured to implement a different queue for each assigned rate of throughput. Dequeueing a data transmission request occurs when the request is accepted from the network. As previously noted, it is also possible to accept data transmission requests from the network even though a maximum number of data transmission requests are being processed, but to queue them within the interceptor until the number of requests being processed is less than the maximum.

Processing of the data transmission request continues at the queue manager as described in detail below. It is noted that concurrently, processing at the interceptor returns to determining operation 602 in order to receive more incoming requests.

At instantiating operation 608, the queue manager receives the data transmission request from the interceptor. The queue manager then instantiates a requester to process the data transmission request. Instantiation may comprise initialization steps such as allocating memory and loading initial values into data structures.

At adding operation 610, the requester is added to one of a plurality of requester queues. Each of the requester queues contains requesters for data transmission requests belonging to the same throughput class. Accordingly, all requesters within a given requestor queue are to be processed with the same rate of throughput. Therefore, the requestor is added to the requestor queue for its own throughput class. Queueing the requestor may be performed by the queue manager or by the requestor itself. In a particular embodiment, upon the initial adding of a requestor to the queue upon initialization, a counter variable tracking the number of requests being concurrently processed is incremented once the requestor is added to the queue.

Requeueing the requestor may be achieved by placing the requestor into the requestor queue in order according to an associated timestamp updated at timestamping operation 614. Specifically, the associated timestamp of the requestor may be compared to the associated timestamps of requesters already in the requestor queue. The requestor may be placed within the requestor queue so that the requestor in front of it (e.g., to be processed before it) has an earlier associated timestamp and so that the requestor behind it (e.g., to be processed after it) has a later associated timestamp. If no requests within the requestor queue have an earlier associated timestamp, the requestor is placed at the head of the requestor queue. If no requests have a later associated timestamp, the requestor is placed at the tail of the requestor queue.

At dequeueing operation 612, the queue manager dequeues the requestor according to a weighted round robin algorithm. It is noted that if a limit on the maximum number of requesters which may concurrently receive data has been reached, the queue manager waits until this condition no longer exists before performing dequeueing operation 612. The weighted round robin algorithm is used to select a requestor queue from which to dequeue a requestor. It is noted that this is equivalent to selecting a throughput class to which the next requestor to be selected shall belong. The weighted round robin algorithm may use a weight vector and a state vector as previously defined, wherein the weights of the vectors are selected in order to cause each requester to have a rate of throughput approximating the assigned rate of throughput of its corresponding data transmission request. Specifically, the queue manager may dequeue a requester from a requester queue having a positive corresponding scalar value in the state vector. The queue manager may then decrement the scalar value of the state vector for the requester queue accessed by the dequeueing operation. If all scalar values in the state vector are non-positive or if all requester queues for which the corresponding scalar value is positive are empty, the queue manager may reinitialize the state vector to the values contained within the weight vector.

At timestamping operation 614, a timestamp representing the time the requester was dequeued from the requester queue may be associated with the dequeued requester.

At retrieving operation 616, the dequeued requester retrieves a defined quantity of data from the server. The defined quantity of data may comprise a fixed number of bytes.

At transmitting operation 618, the dequeued requester transmits the defined quantity of data to the electronic device which instantiated the data transmission request. Alternatively, the defined quantity of data may be stored or cached locally for later transmission.

At determining operation 620, it is determined whether the requested data are completely transmitted to the electronic device. If not, control returns to adding operation 610. It is noted that this causes the requester to be replaced within the queue. If the data are completely transmitted, processing finishes with deinstantiating operation 620.

At deinstantiating operation 620, the requester is deinstantiated. Deinstantiation may comprise decrementing a counter variable tracking the number of requests currently being processed. It is noted that this action may cause another data transmission request to be processed. Deinstantiation may also comprise "garbage collection", such as freeing any resources which had been used by it.

Figure 7:
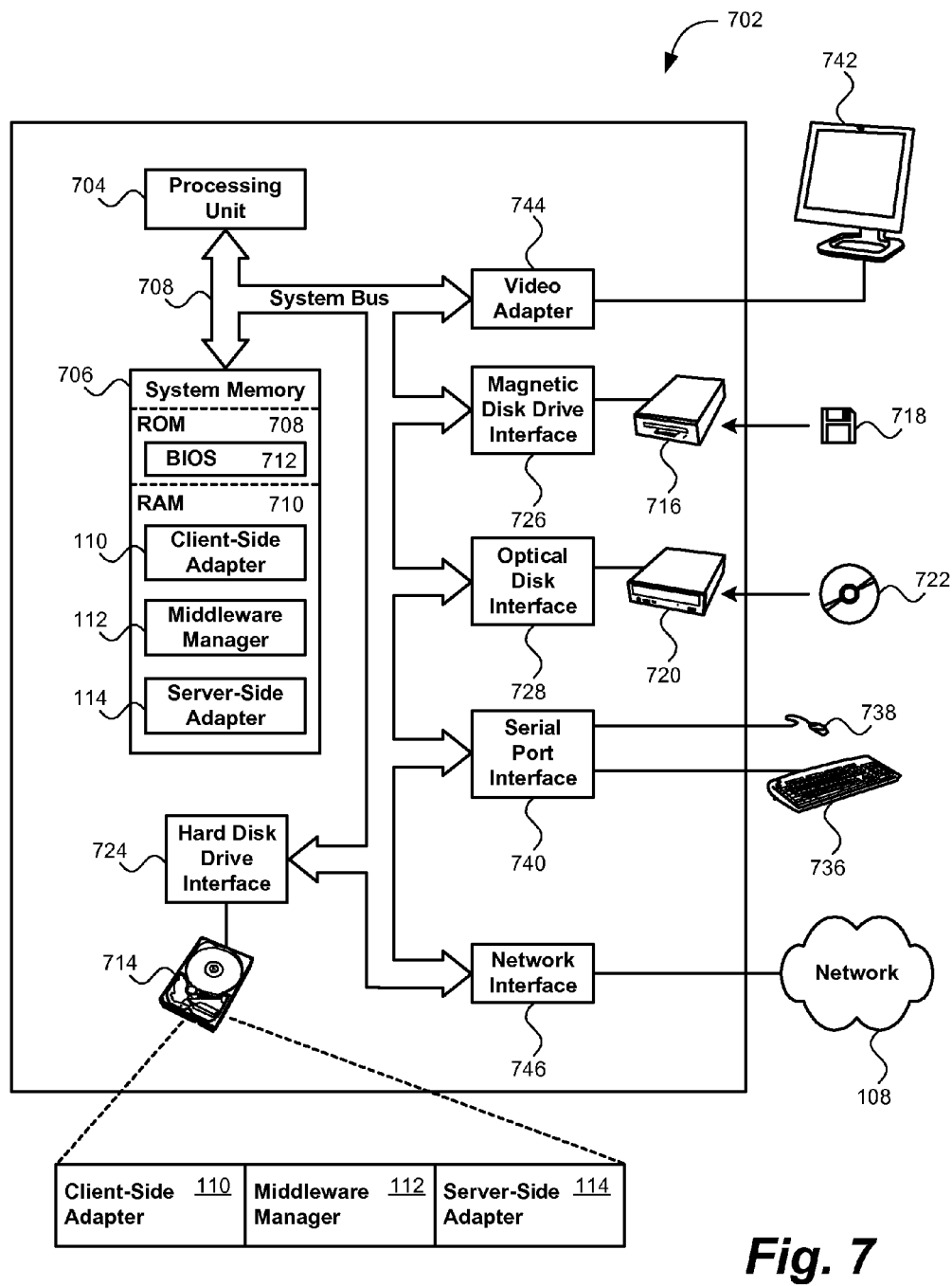
FIG. 7 shows an illustrative embodiment of a computer system embodying the present invention.

With reference to FIG. 7, an illustrative embodiment of a computer system 702 in accordance with the present invention is shown. One computer system 702 in which the present invention is potentially useful encompasses the general-purpose computer. Examples of such computers include SPARC (r) systems offered by Sun Microsystems, Inc. and Pentium(r) based computers available from International Business Machines Corp. and various other computer manufacturers. SPARC is a registered trademark of Sun Microsystems, Inc. and Pentium is a registered trademark of Intel Corporation.

The computer system 702 includes a processing unit 704, a system memory 706, and a system bus 708 that couples the system memory 706 to the processing unit 704. The system memory 706 includes read only memory (ROM) 708 and random access memory (RAM) 710. A basic input/output system (BIOS) 712, containing the basic routines that help to transfer information between elements within the computer system 702, such as during start-up, is stored in ROM 708.

The computer system 702 further includes a hard disk drive 714, a magnetic disk drive 716 (to read from and write to a removable magnetic disk 718), and an optical disk drive 720 (for reading a CD-ROM disk 722 or to read from and write to other optical media). The hard disk drive 714, magnetic disk drive 716, and optical disk drive 720 are connected to the system bus 708 by a hard disk interface 724, a magnetic disk interface 726, and an optical disk interface 728, respectively. The drives and their associated computer-readable media provide nonvolatile storage for the computer 104. Although computer-readable media refers to a hard disk, removable magnetic media and removable optical media, it should be appreciated by those skilled in the art that other types of media that are readable by a computer, such as flash memory cards, may also be used in the illustrative computer system 702.

A number of program modules may be stored in the drives and RAM 710, including the client-side adapter 110, the middleware manager 112, the server-side adapter 114, and other program modules and data (not shown). As discussed above, the computer system 702 is configured to transmit requested data from a data source in response to data transmission requests from at least one electronic device according to differential rates of throughput.

For example, the middleware manager 112 may be configured to classify the data transmission requests into one of a plurality of throughput classes. Each of the plurality of throughput classes has an assigned rate of throughput. The middleware manager 112 selects a proportion of data transmission requests to be processed from each throughput class such that each data transmission request has a rate of throughput approximating the assigned rate of throughput of its class.

In another embodiment of the computer system 702, the drives and RAM 710 may include requesters, requester queues, and a queue manager. As data transmission requests arrive at the computer system 702, requesters are instantiated. A requester is added to one of a plurality of requester queues containing requesters for data transmission requests belonging to the same throughput class. The queue manager dequeues the requester according to a weighted round robin algorithm. Once dequeued, the requester retrieves a defined quantity of data and transmits the data to the electronic device. The queue manager iteratively repeats the adding, dequeuing, retrieving and transmitting operations until the requested data is completely transmitted to the electronic device.

A user may enter commands and information into the computer system 702 through a keyboard 736 and pointing device, such as a mouse 738. Other input devices (not shown) may include a microphone, modem, joystick, game pad, satellite dish, scanner, or the like. These and other input devices are often connected to the processing unit through a serial port interface 740 that is coupled to the system bus 708.

A monitor 742 or other type of display device is also connected to the system bus 708 via an interface, such as a video adapter 744. In addition to the monitor, the node 702 may include other peripheral output devices (not shown), such as speakers and printers.

The computer system 702 operates in a networked environment using logical connections to one or more remote devices. The remote device may be a server, a router, a client, a peer device and other common electronic device or network node. When used in a networking environment, the computer system 702 is typically connected to the network 108 through a network interface 746. In a network environment, program modules depicted relative to the computer system 702, or portions thereof, may be stored in one or more remote memory storage devices.

The network interface 746 receives data transmission requests from at least one electronic device and sends the requested data to the electronic device. Furthermore, the network interface 746 may receive requested data from a server (not shown) coupled to the network 110.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

It should be noted that the methods of the present invention may be embedded in a program product, which includes all features for implementing the methods of the present invention and can implement the methods when it is loaded in a machine system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method for transmitting requested data from a data source in response to data transmission requests from at least one electronic device according to differential rates of throughput, the method comprising:
   classifying the data transmission requests into one of a plurality of throughput classes, each of the plurality of throughput classes having an assigned rate of throughput;
   selecting a proportion of data transmission requests to be processed from each throughput class such that each data transmission request has a rate of throughput approximating the assigned rate of throughput of its throughput class;
   instantiating at least one requestor for each of the selected data transmission requests, the requestor configured to retrieve a defined quantity of data from the data source;
   assigning a sequence number to each of the defined quantities of data;
   storing each received defined quantity of data at a buffer position in a data buffer, the buffer position being based on the sequence number modulo the number of buffer positions available at the buffer; and
   transmitting the defined quantity of data to the electronic device when at least two buffer positions containing the defined quantity of data are continuous;
   fetching the defined quantity of data by the requestor from the data source;
   queuing the requestor;
   dequeuing the requestor after a defined period of time calculated to cause the rate of throughput to approximate the assigned rate of throughput for the data transmission request;
   and iteratively repeating the fetching, queuing and dequeuing operations until the requested data is completely transmitted to the electronic device; and
   wherein the defined period of time exceeds, within a defined degree of statistical confidence, an actual round-trip response time between a client-side adapter and a middleware manager, wherein the client-side adapter is configured to receive the data request from the electronic device and the middleware manager is configured to control the response time of requests.

2. The method of claim 1, wherein selecting the proportion of data transmission requests to be processed is performed in a weighted round-robin manner such that data transmission requests with higher rates of throughput are selected more often than data transmission requests with lower rates of throughput.

3. The method of claim 1, further comprising suspending the requesting of defined quantities of data by the requestors when half of the data in the data buffer has not been transmitted.

4. The method of claim 1, further comprising:
   instantiating a requestor for the data transmission request;
   adding the requestor to one of a plurality of requestor queues, each of the requestor queues containing requestors for data transmission requests belonging to the same throughput class;
   dequeuing the requestor according to a weighted round robin algorithm;
   retrieving a defined quantity of data by the dequeued requestor;
   transmitting the defined quantity of data to the electronic device; and
   iteratively repeating the adding, dequeuing, retrieving and transmitting operations until the requested data is completely transmitted to the electronic device.

5. The method of claim 4, wherein the dequeuing the requestors comprises:
   configuring a weight vector having a scalar value for each requestor queue, the scalar value for each requestor queue determined such that its proportion to the sum of all scalar values in the weight vector approximates the proportion of bandwidth made available to data transmission requests having the rate of throughput for the requestor queue;
   initializing a state vector to contain the same scalar values as the weight vector;
   dequeuing a requestor from a requestor queue having a positive corresponding scalar value in the state vector;

decrementing the scalar value of the state vector for the requestor queue accessed by the dequeuing operation; and iteratively repeating the dequeuing and decrementing operations until all scalar values in the state vector are non-positive or until all requestor queues for which the scalar value is positive are empty.

6. The method of claim 4, further comprising:

associating timestamps with the dequeued requestors, the timestamps representing the time requestors are dequeued from the requestor queues; and wherein requeuing requestors includes placing requestors into the requestor queues in order according to their associated timestamps.

7. The method of claim 4, further comprising:

queuing data transmission requests when a maximum number of data transmission requests are being processed; and dequeuing the data transmission requests according to their assigned rate of throughput using a weighted round robin algorithm.

8. A system for transmitting data at a defined rate of throughput in response to client data requests, the system comprising:

a computer processor carried by first computer;

a client-side adapter executing on the first computer and configured to instantiate one or more requestors in response to a client data request, each requestor configured to periodically request a defined quantity of data, store a received defined quantity of data and wait for a defined period of time, the defined period of time calculated to cause rate of throughput for the client data request to approximate a defined value;

a middleware manager executing on a second computer and configured to control a response time for the client data requests;

a data buffer configured to store received defined quantities of data from the requestors, the data buffer including a predetermined number of positions;

wherein each of the requestors includes a sequence number such that each received defined quantity of data from the requestors is positioned in the data buffer according to the sequence number modulo the predetermined number of positions in the data buffer;

and wherein the defined period of time includes a time factor which, within a desired degree of confidence, exceeds a response time between the client-side adapter and a middleware manager.

9. The system of claim 8, wherein the client-side adapter is configured to transmit data to the client only when at least two buffer positions containing the defined quantity of data are continuous.

10. The system of claim 9, wherein the client-side adapter is configured to suspend instantiating one or more requestors if half of the data buffer contains the defined quantities of data from the requestors.

11. A system for transmitting data in response to data requests from at least one client according to differential rates of throughput, the system comprising:

a computer processor;

at least one requestor provided by the computer processor and associated with a data request, the data request assigned a rate of throughput, the requestor configured to request a defined quantity of data from a server executing on a first computer and transmit the defined quantity of data to the client executing on a second computer;

one or more requestor queues, each requestor queue configured to contain requestors corresponding to data requests with a particular assigned rate of throughput;

a queue manager configured to instantiate the requestor in response to the data request and to dequeue the requestor from the requestor queue according to a weighted round robin algorithm;

wherein the requestor, upon being dequeued, is configured to requeue itself within the requestor queue if data subject to the data request are not completely transmitted;

wherein the queue manager is configured to associate timestamps with the dequeued requestors, the timestamps representing the time requestors are dequeued from the requestor queues;

wherein the queue manager is configured to requeue requestors by placing requestors into the requestor queues in order according to their associated timestamps; and wherein the timestamps exceeds, within a defined degree of statistical confidence, an actual round-trip response time between a client-side adapter and a middleware manager, wherein the client-side adapter is configured to receive the data request from the electronic device and the middleware manager is configured to control the response time of requests.

12. The system of claim 11, wherein the system further comprises:

a weight vector having a scalar value for each requestor queue, the scalar value for each requestor queue determined such that its proportion to the sum of all scalar values in the weight vector approximates the proportion of a bandwidth made available to data requests having the rate of throughput for the requestor queue;

a state vector configured to initially contain scalar values identical to those in the weight vector; and wherein the queue manager is further configured to dequeue a requestor from a requestor queue with a positive scalar value in the state vector and decrement the scalar value for the requestor queue accessed until all scalar values in the state vector are non-positive or until all requestor queues for which the scalar value is positive are empty.

13. A computer program product for transmitting requested data from a data source in response to data transmission requests from at least one electronic device according to differential rates of throughput, the computer program product comprising a non-transitory computer-readable medium embodying computer program code, the computer program code comprising computer executable instructions configured for:

classifying the data transmission requests into one of a plurality of throughput classes, each of the plurality of throughput classes having an assigned rate of throughput;

selecting a proportion of data transmission requests to be processed from each throughput class such that each data transmission request has a rate of throughput approximating the assigned rate of throughput of its throughput class;

instantiating at least one requestor for each of the selected data transmission requests, the requestor configured to retrieve a defined quantity of data from the data source;

assigning a sequence number to each of the defined quantities of data;

storing each received defined quantity of data at a buffer position in a data buffer, the buffer position being based on the sequence number modulo the number of buffer positions available at the buffer;

transmitting the defined quantity of data to the electronic device when at least two buffer positions containing the defined quantity of data are continuous;

fetching the defined quantity of data by the requestor from the data source;

queuing the requestor;

dequeuing the requestor after a defined period of time calculated to cause the rate of throughput to approximate the assigned rate of throughput for the data transmission request;

iteratively repeating the fetching, queuing and dequeuing operations until the requested data are completely transmitted to the electronic device; and wherein the defined period of time exceeds, within a defined degree of statistical confidence, an actual round-trip response time between a client-side adapter and a middleware manager, wherein the client-side adapter is configured to receive the data request from the electronic device and the middleware manager is configured to control the response time of requests.

14. The computer program product of claim 13, wherein selecting the proportion of data transmission requests to be processed is performed in a weighted round-robin manner such that data transmission requests with higher rates of throughput are selected more often than data transmission requests with lower rates of throughput.

15. The computer program product of claim 13, further comprising computer executable instructions configured for:

instantiating a requestor for the data transmission request;

adding the requestor to one of a plurality of requestor queues, each of the requestor queues containing requestors for data transmission requests belonging to the same throughput class;

dequeuing the requestor according to a weighted round robin algorithm;

retrieving a defined quantity of data by the dequeued requestor;

transmitting the defined quantity of data to the electronic device; and iteratively repeating the adding, dequeuing, retrieving and transmitting until the requested data are completely transmitted to the electronic device.

\* \* \* \* \*